United States Patent
Zalevsky et al.

(10) Patent No.: US 12,386,238 B2
(45) Date of Patent: Aug. 12, 2025

(54) OPTICAL QUANTUM LOGIC GATES

(71) Applicant: Cognifiber Ltd., Rosh Ha'Ayin (IL)

(72) Inventors: Zeev Zalevsky, Rosh Ha'Ayin (IL); Eyal Cohen, Gedera (IL)

(73) Assignee: Cognifiber Ltd., Rosh Ha'ayin (IL)

( * ) Notice: Subject to any disclaimer, the term of this patent is extended or adjusted under 35 U.S.C. 154(b) by 660 days.

(21) Appl. No.: 17/693,528

(22) Filed: Mar. 14, 2022

(65) Prior Publication Data
US 2022/0291569 A1 Sep. 15, 2022

Related U.S. Application Data

(60) Provisional application No. 63/161,224, filed on Mar. 15, 2021.

(51) Int. Cl.
*G02F 3/00* (2006.01)
*G06N 10/20* (2022.01)
*G06N 10/40* (2022.01)

(52) U.S. Cl.
CPC .............. *G02F 3/00* (2013.01); *G06N 10/20* (2022.01); *G06N 10/40* (2022.01); *G02F 2201/02* (2013.01)

(58) Field of Classification Search
CPC ....... G02F 3/00; G02F 2201/02; G06N 10/20; G06N 10/40; G06N 10/00; G06E 3/001; A61K 41/0004
See application file for complete search history.

(56) References Cited

U.S. PATENT DOCUMENTS 9,030,731 B2  5/2015 Arahira
9,274,274 B1  3/2016 Xu
(Continued)

FOREIGN PATENT DOCUMENTS

WO  2017033197 A1  3/2017
WO  2019186548 A1  10/2019
WO  2021064727 A2  4/2021

OTHER PUBLICATIONS

Zhao, T.H., Ren, W.H., Yin, T.Y. and Wang, F. (2021) Calculation of the Coupling Coefficient of Twin-Core Fiber Based on the Supermode Theory with Finite Element Method. Optics and Photonics Journal, 11, 402-411.
(Continued)

*Primary Examiner* — Collin X Beatty
(74) *Attorney, Agent, or Firm* — CANTOR COLBURN LLP

(57) ABSTRACT

There are provided optical quantum logic gate (OQLG) characterized by $2^n*2^n$ unitary matrix and method of operating thereof. OQLG comprises first optical structure comprising $2^n$ optically-coupled cores with one-to-one correspondence to input binary values specified by the matrix and second optical structure optically connected to the first optical structure and comprising $2^n$ amplifying channels corresponding to the $2^n$ cores. The first optical structure is configured to receive photons in binary fundamental quantum states (FQSs) representing input binary values specified by the matrix and to inject the received photons in the $2^n$ cores, use optical coupling between the cores to mix the injected photons, and output photons into the second optical structure, wherein outputted mixed photons correspond to output binary values specified by the matrix. The second optical structure is configured to amplify, in a controllable manner, photons in the amplifying channels with preserving the FQSs and relative quantities of photons with different FQSs.

18 Claims, 8 Drawing Sheets

(56) References Cited

U.S. PATENT DOCUMENTS

| | | |
|---|---|---|
| 10,133,147 B2 | 11/2018 | Earl |
| 11,526,463 B2* | 12/2022 | Maassen van den Brink ............. G06F 15/76 |
| 2010/0002276 A1* | 1/2010 | Ham ........................ G02F 3/00 359/108 |
| 2019/0354894 A1* | 11/2019 | Lazovich .................. G06E 1/00 |

OTHER PUBLICATIONS

Cincotti G: "Prospects on Planar Quantum Computing", Journal of Lightwave Technology, IEEE, USA, vol. 27, No. 24, Dec. 15, 2009 (Dec. 15, 2009), pp. 5755-5766.

European Search Report for corresponding application EP22162022; Report dated Sep. 9, 2022.

Shehab Omar Ed—Donkor Eric et al: "All 1-15 optical XOR, CNOT gates with initial insight for quantum computation using linear optics", Quantum Information and Computation X, SPIE, 1000 20th St. Bellingham WA 98225-6705 USA, vol. 8400, No. 1, May 11, 2012 (May 11, 2012), pp. 1-14.

* cited by examiner

Prior Art

| | Operator | Gate(s) | Matrix |
|---|---|---|---|
| (11) | Pauli-X (X) | –X– | $\begin{bmatrix} 0 & 1 \\ 1 & 0 \end{bmatrix}$ |
| (12) | Pauli-Y (Y) | –Y– | $\begin{bmatrix} 0 & -i \\ i & 0 \end{bmatrix}$ |
| (13) | Pauli-Z (Z) | –Z– | $\begin{bmatrix} 1 & 0 \\ 0 & -1 \end{bmatrix}$ |
| (14) | Hadamard (H) | –H– | $\frac{1}{\sqrt{2}}\begin{bmatrix} 1 & 1 \\ 1 & -1 \end{bmatrix}$ |
| (15) | Phase (S, P) | –S– | $\begin{bmatrix} 1 & 0 \\ 0 & i \end{bmatrix}$ |
| (16) | $\pi/8$ (T) | –T– | $\begin{bmatrix} 1 & 0 \\ 0 & e^{i\pi/4} \end{bmatrix}$ |

| | Operator | Gate(s) | Matrix |
|---|---|---|---|
| (17) | Controlled Not (CNOT, CX) | | $\begin{bmatrix} 1 & 0 & 0 & 0 \\ 0 & 1 & 0 & 0 \\ 0 & 0 & 0 & 1 \\ 0 & 0 & 1 & 0 \end{bmatrix}$ |
| (18) | Controlled Z (CZ) | | $\begin{bmatrix} 1 & 0 & 0 & 0 \\ 0 & 1 & 0 & 0 \\ 0 & 0 & 1 & 0 \\ 0 & 0 & 0 & -1 \end{bmatrix}$ |
| (19) (20) | SWAP | | $\begin{bmatrix} 1 & 0 & 0 & 0 \\ 0 & 0 & 1 & 0 \\ 0 & 1 & 0 & 0 \\ 0 & 0 & 0 & 1 \end{bmatrix}$ |
| (21) | Toffoli (CCNOT, CCX, TOFF) | | $\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{bmatrix}$ |

*Wikipedia, Quantum Logic Gate

Figure 1

Prior Art

Zhao, T.H., Ren, W.H., Yin, T.Y. and Wang, F. (2021) Calculation of the Coupling Coefficient of Twin-Core Fiber Based on the Supermode Theory with Finite Element Method. Optics and Photonics Journal, 11, 402-411

Prior Art

Zhao, T.H., Ren, W.H., Yin, T.Y. and Wang, F. (2021) Calculation of the Coupling Coefficient of Twin-Core Fiber Based on the Supermode Theory with Finite Element Method. Optics and Photonics Journal, 11, 402-411

Prior Art

Zhao, T.H., Ren, W.H., Yin, T.Y. and Wang, F. (2021) Calculation of the Coupling Coefficient of Twin-Core Fiber Based on the Supermode Theory with Finite Element Method. Optics and Photonics Journal, 11, 402-411

OPTICAL QUANTUM LOGIC GATES

CROSS-REFERENCES TO RELATED APPLICATIONS

The present application claims benefit from U.S. Provisional Application No. 63/161,224 filed on Mar. 15, 2021 incorporated hereby by reference in its entirety.

TECHNOLOGICAL FIELD

The present invention relates to optical computation devices, and more specifically, optical computation devices and optical systems suitable for optical quantum computing.

BACKGROUND

Optical computing utilizes manipulation on visible or infrared light to perform computation processes rather than electric current in electronic computing. Generally, optical computing enables faster computation rates as compared to electronic systems. This is partly since manipulations on light pulses can occur faster and can allow transmission of higher bandwidth of information. For example, electric current signal propagates at only about 10 percent of the speed of light due to the much larger dielectric constant in the microwave range in respect to the optical regime, exemplifying almost 10-fold improvement in computing rate for optical computing. Optics also consumes less power and is less exposed to cross talk due to neighbour electrical fields since photons unlike electros are not polar and do not carry electrical charge.

Conventional optical processing systems typically utilizes electronic-optical hybrid processing, generally referred to as optoelectronic processing. In these systems optical signals are used for data transmission and for certain processing operations and being converted to electronic signals for certain other processing operations. Such optoelectronic devices may lose about 30% of their energy converting electronic energy into photons and back. Moreover, the conversion of optical to electronic signals and back slows the transmission and processing of data. High research efforts are directed at all-optical computing, which eliminates the need for optical-electrical-optical (OEO) conversions, thus lessening the need for electrical power and increasing processing rate.

Problems of all-optical computing have been recognized in the conventional art and various techniques have been developed to provide solutions, for example:

International Patent Publication WO 2017/033197 teaches an integrated optical module. The optical module comprises multi optically-coupled channels and enables the use thereof in an Artificial Neural Network (ANN). According to some embodiments the integrated optical module comprises a multi-core optical fiber, wherein the cores are optically coupled.

International Patent Publication WO 2019/186548 discloses an artificial neuron unit and neural network for processing of input light. The artificial neuron unit comprises a modal mixing unit, such as multimode optical fiber, configured for receiving input light and applying selected mixing to light components of two or more modes within the input light and for providing exit light, and a filtering unit configured for applying preselected filter onto said exit light for selecting one or more modes of the exit light thereby providing output light of the artificial neuron unit.

International Patent Publication WO2021/064727 discloses an artificial neuron network and corresponding neuron units. The neuron network comprises a plurality of two or more layers of artificial neuron units. The layers of artificial neuron units are configured for communicating between them via an arrangement of two or more optical waveguide (optical fibers). The arrangement of two or more optical waveguides are configured with predetermined coupling between the two or more waveguides, thereby providing cross communication between neuron units of said two or more layers.

The references cited above teach background information that may be applicable to the presently disclosed subject matter. Therefore, the full contents of these publications are incorporated by reference herein where appropriate for appropriate teachings of additional or alternative details, features and/or technical background.

GENERAL DESCRIPTION

In the previous works cited above, the inventors of the present invention have disclosed, inter alia, optical units usable for Photonic Integrated Circuits, including artificial neural networks. The inventors have recognized and appreciated that the optical units can be configured so to enable operating as optical quantum logic gates usable for quantum information processing.

In accordance with certain aspects of the presently disclosed subject matter, there is provided an optical quantum logic gate (OQLG) acting on n qubits and characterized by $2^n * 2^n$ unitary matrix. The OQLG comprises: a first optical structure comprising $2^n$ optically-coupled cores with one-to-one correspondence to input binary values specified by the unitary matrix and a second optical structure optically connected to the first optical structure and comprising $2^n$ amplifying channels corresponding to the $2^n$ cores. The first optical structure is configured to receive photons in binary fundamental quantum states representing input binary values specified by the unitary matrix and to inject the received photons in the $2^n$ cores in accordance with the one-to-one correspondence of the cores and fundamental states of the photons; to use optical coupling between the cores to mix the injected photons, wherein photons are mixed with weights specified by the unitary matrix; and to output photons into the second optical structure, wherein outputted mixed photons correspond to output binary values specified by the matrix. The second optical structure is configured to amplify photons in the amplifying channels, wherein the amplifying is provided in a controllable manner with preserving, for photons propagating in the amplifying channels, the fundamental quantum states thereof and relative quantities of photons with different fundamental quantum states.

By way of non-limiting example, real-number input binary values specified by the unitary matrix can be represented by fundamental quantum states of vertical and horizontal polarization. A complex-number binary value specified by the unitary matrix can be represented by a respective superposition of photons in fundamental quantum states. Optionally, the first optical structure can be configured to mix the received photons and, thereby, to provide the superposition prior to injecting the superposed photons in a core corresponding to the complex-number binary value.

In accordance with further aspects and optionally, in combination with other aspects of the presently disclosed subject matter, the weights can be pre-defined as a function of a coupling length of the first optical structure, wherein the coupling length can be pre-defined by selection of optical and geometrical parameters of the cores and a cladding therebetween.

In accordance with further aspects and optionally, in combination with other aspects of the presently disclosed subject matter, the first optical structure and the second optical structure can be integrated and implemented on the same cores of a multi-core optical fiber. Optionally, each core of $2^n$ cores in the multi-core optical fiber can be configured to comprise a first segment being a part of the first optical structure and a second segment following the first segment and being a part of the second optical structure. Optionally, the multi-core optical fiber can be configured to have a tapered configuration with first segments of each core being located in a tapered part enabling optical coupling between the first segments, and with second segments being located in a wide part enabling a distance sufficient to prevent an optical interaction between the second segments.

In accordance with further aspects and optionally, in combination with other aspects of the presently disclosed subject matter, each amplifying channel is associated with a control port configured to enable, in response to a control signal specifying a desired amplification factor, amplification required in the amplifying channel. Each amplifying channel can be impregnated with gain medium configured to provide gain at a first wavelength range corresponding to the outputted mixed photons, the gain achievable in response to a pumping optical signal received via the control port and having a pumping wavelength range different from the first wavelength range.

In accordance with further aspects and optionally, in combination with other aspects of the presently disclosed subject matter, the amplification factor can be controlled, at least, by defining parameters of the pumping optical signal, gain medium and/or effective length of the amplifying channel.

In accordance with further aspects and optionally, in combination with other aspects of the presently disclosed subject matter, the OQLG above can be configured to be arrangeable into all-optical arrangements of a plurality of OQLGs.

In accordance with further aspects and optionally, in combination with other aspects of the presently disclosed subject matter, using the entanglement phenomena can further improve connectivity and/or cascading of OQLGs in all-optical arrangements. For example, the OQLG can be operatively connected to at least one second OQLG, wherein a logical connection between an output of the OQLG and an input of the at least one second OQLG can be provided with the help of an optical structure configured to generate a plurality of photons with entangled binary fundamental quantum states and to enable injecting, in a certain proportion, the generated entangled photons into an input of the OQLG and the input of the at least one second OQLG.

In accordance with other aspects of the presently disclosed subject matter, there is provided a method of operating an optical quantum logic gate (OQLG) acting on n qubits and characterized by $2^n*2^n$ unitary matrix. The method comprises: receiving in the OQLG a plurality of photons in binary fundamental quantum states representing input binary values specified by the unitary matrix, wherein the OQLG comprises an optical structure with $2^n$ optically-coupled cores with one-to-one correspondence to the input binary values specified by the unitary matrix, and wherein the received photons are injected in the cores in accordance with the one-to-one correspondence; using optical coupling between the cores to mix the injected photons, wherein photons are mixed with pre-defined weights enabled by design of the optical structure; outputting photons into $2^n$ optical amplifying channels corresponding to the $2^n$ cores, wherein outputted mixed photons correspond to output binary values specified by the matrix; amplifying photons in the amplifying channels, wherein the amplifying is provided in a controllable manner with preserving, for photons propagating in the amplifying channels, the fundamental quantum states thereof and relative quantities of photons with different fundamental quantum states; and providing quantum readout of photons outputted from the amplifying channels.

In accordance with further aspects and optionally, in combination with other aspects of the presently disclosed subject matter, the weights can be pre-defined as a function of a coupling length of the optical structure, and the coupling length can be pre-defined by selection of optical and geometrical parameters of the cores and a cladding therebetween.

In accordance with further aspects and optionally, in combination with other aspects of the presently disclosed subject matter, the method can further comprise receiving by a control port of the OQLG a control signal specifying a desired amplification factor in an amplifying channel and providing an amplification in response.

Each amplifying channel can be impregnated with gain medium configured to provide gain at a first wavelength range corresponding to the outputted mixed photons, while the control signal can be a pumping optical signal received via the control port and having a pumping wavelength range different from the first wavelength range.

The amplification factor can be controlled, at least, by defining parameters of the pumping optical signal, gain medium and/or effective length of the amplifying channel. In accordance with further aspects and optionally, in combination with other aspects of the presently disclosed subject matter, OQLGs and arrangements thereof can operate on photons with substantially the same wavelength or on photons with different, relatively close, wavelength multiplexed prior to inputting to the OQLG.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1 illustrates non-limiting examples of quantum logical gates (QLG) as known in the art;

DETAILED DESCRIPTION

Figure 2A:
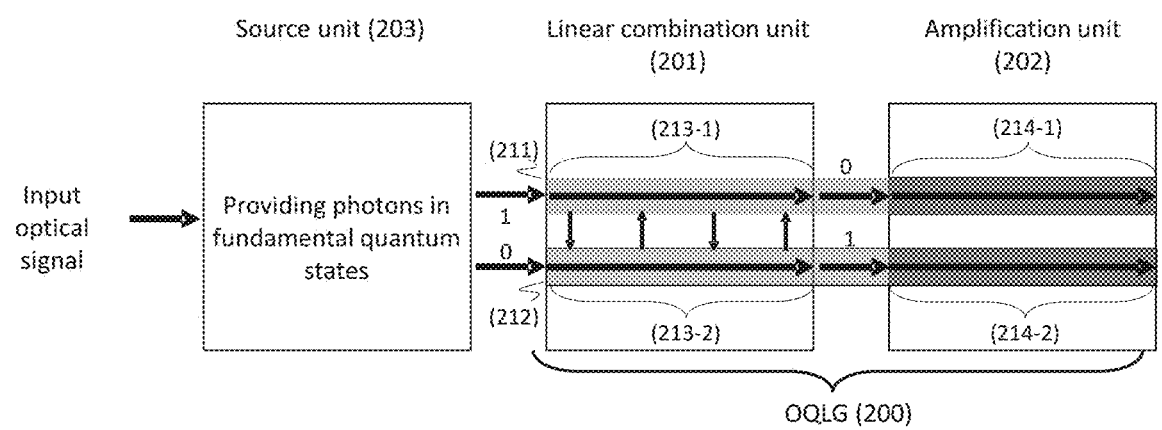
FIG. 2a illustrates a generalized functional block diagram of optical quantum logical gate (OQLG) in accordance with certain embodiments of the presently disclosed subject matter.

The field of quantum processing is the rapidly growing emergent arena for new technologies. Conventional computers work by manipulating bits that exist in either a 0 state or a 1 state. In contrast, quantum computers encode information as quantum bits, or qubits, which can exist in 0 state, 1 state or a superposition of 0 and 1 states. Thus, qubits have the ability to be in the state of 0 or 1 with different probabilities instead of deterministically choosing between zero or one.

Superposition, quantum measurement, and entanglement are three phenomena that are central to quantum computing. Superposition is the ability of quantum system to be at many different states at the same time. Quantum measurement is an act of observing a quantum particle in superposition and resulting in one of the possible states.

The superposition of qubits can give quantum computers inherent parallelism and allow a quantum computer to work on a large number of computations at once, while conventional computers work on one computation at a time. When a quantum computing memory consists of N bits of information, it has 2N possible states. A vector representing all memory states thus has 2N entries (one for each state). This vector is viewed as a probability vector and represents the fact that the memory is to be found in a particular state. While in the classical view, one entry would have a value of 1 (i.e. a 100% probability of being in this state) and all other entries would be zero, in quantum mechanics, probability vectors are generalized to density operators. A quantum memory may then be found in any quantum superposition of its classical states.

Entanglement is the ability of quantum particles to correlate their measurement results with each other. When particles become entangled, they form a single system such that the quantum state of any one particle cannot be described independently of the quantum state of the other particles. This means that whatever operation or process is applied to one particle, it correlates to the other entangled particles as well. The effects of quantum measurement also apply to entangled particles, such that when one particle is measured and collapses, the other particles collapse as well. Due to correlation between the entangled particles, measuring the state of one particle can provide information about the state of the other. Thus, effect of entanglement enables making measurement of the qubits indirectly to preserve their integrity (i.e., without changing their values). Examples of entangled states include position, angular momentum, spin, polarization, energy, and time.

Like classical logic gates are building blocks for conventional digital circuits, quantum logic gates are building blocks for quantum circuits.

A logic gate, whether classical or quantum, is any physical structure takes a set of binary inputs and spits out a single binary output, wherein the output is governed by a Boolean function.

Classical logic gates implement classical logic operations. For example:

an inverter or NOT gate is a basic logic gate which implements logical negation. An inverter circuit outputs a voltage representing the opposite logic-level to its input. Its main function is to invert the input signal applied. If the applied input is low then the output becomes high and vice versa;

an AND gate is a basic logic gate that implements logical conjunction. A HIGH output (1) results only if all the inputs to the AND gate are HIGH (1). If none or not all inputs to the AND gate are HIGH, LOW output results;

an OR gate is a basic logic gate that implements logical disjunction. A HIGH output (1) results if one or both the inputs to the gate are HIGH (1). If neither input is high, a LOW output (0) results.

It has been shown in the conventional art that, in addition to classical logical operations, quantum computers can use nonclassical logic operations.

Examples of the various quantum logic gates (denoted 11-21) known in the art are illustrated in FIG. 1.

As an example of a classical logic function, one can consider Pauli X logical gate implementing a conventional NOT operation, which simply flips values in a single qubit from 0 to 1 or from 1 to 0. In other gates, in addition to the usual NOT, a quantum computer could also implement, for example, a new type of logic operation known as the square root of NOT. When this operation is applied twice (squared), it produces the usual NOT, but if it is applied only once, it gives a logic operation with no classical interpretation.

A logic of a quantum logic gate is represented by a unitary matrix. The number of qubits in the input and output of the gate must be equal; a gate which acts on n qubits is represented by a $2^n \times 2^n$ unitary matrix. The quantum states that the gates act upon are vectors in $2^n$ complex dimensions. The base vectors represent the possible outcomes if measured, and a quantum state is a linear combination of these outcomes. The output quantum state can be represented as an output vector resulting from multiplying the respective matrices.

The most common quantum gates operate on spaces of one or two qubits, like the common classical logic gates operate on one or two bits.

Bearing the above in mind, attention is drawn to FIG. 2 illustrating a generalized functional block diagram of an all-optical structure configured, in accordance with certain embodiments of the currently disclosed subject matter, to operate as an optical quantum logic gate.

Quantum logical gate (QLG) can operate on space of one or more qubits, depending on the QLG type. For example, QLGs 11-16 illustrated in FIG. 1 operate on space of one qubit, QLGs 17-20 are two-qubits gates and Toffoli Gate 21 is three-qubit gate.

For purpose of illustration only, the following description is provided for one-qubit QLGs. Those skilled in the art will readily appreciate that the teachings of the presently disclosed subject matter are, likewise, applicable to QLGs operating with other numbers of qubits and to appropriate combinations of QLGs of the same and/or different types.

Optical quantum logic gate (OQLG) 200 comprises an optical linear combination unit 201 optically connected to an optical amplification unit 202. In accordance with certain embodiments of the presently disclosed subject matter, OQLG 200 can be implemented as a photonic device based on a multi-core optical fiber with at least part of the cores being optically-coupled.

OQLG 200 is optically connected with a source unit 203 configured to enable injecting into OQLG 200 a plurality of photons in binary fundamental quantum states (e.g. horizontally polarized and vertically polarized photon states). Fundamental quantum states correspond to the binary values represented by photons, for example the states of vertical and horizontal polarization can correspond to the values 0 and 1, respectively. Then, any other binary values usable in OQLG (e.g. values in QLSs 12-16 or 18 illustrated in FIG. 1) can correspond to a respective superposition of these two states.

Source unit 203 can comprise an optical structure based on non-linear crystal and capable of splitting input optical signals into bi-photons (i.e. two simultaneously produced photons with binary distinguishable optical properties). In certain embodiments, source unit 203 can be further configured to generate entangled photons. The optical structure can operate using spontaneous nonlinear parametric processes occurring, depending on the platform material, via second-order ($\chi^{(2)}$) or third-order ($\chi^{(3)}$) nonlinearities, where either one (for $\chi^{(2)}$) or two (for $\chi^{(3)}$) photons from an intense pump laser are annihilated into two daughter photons. The $\chi^{(2)}$ process is called spontaneous parametric down-conversion (SPDC), while the $\chi^{(3)}$ process is called spontaneous four-wave mixing (SFWM). By way of non-limiting examples, source unit 203 can be implemented in accordance with teachings of U.S. Pat. Nos. 10,133,147, 9,274,274, and 9,030,731 or any other appropriate technique.

Linear combination unit 201 is configured to receive the plurality of photons in binary fundamental quantum states and inject the received photons as inputs into different, optically-coupled, cores of the multi-core fiber. Each core is configured in one-to-one correspondence to input binary values specified by the unitary matrix and dedicated to input photons corresponding to a respectively predefined binary input value. The number of cores is equal to number of inputs (and, respectively outputs) in a corresponding OQLG, and the input and output binary values are defined by the respective unitary matrix.

FIG. 2 illustrates a non-limiting example of Pauli X OQLG. Linear combination unit 201 illustrated therein comprises a core 211 dedicated for input photons with vertical polarization (corresponding to the value 1) and core 212 dedicated for input photons with horizontal polarization (corresponding to the value 0).

By way of another (not shown) non-limiting example, a linear combination unit of CNOT OQLG or SWAP OQLG are configured to comprise four optical cores dedicated for input photons corresponding, respectively, to values {1, 0, 0, 0}, and a linear combination unit of Toffoli OQLG is configured to comprise eight optical cores dedicated for input photons corresponding, respectively, to values {1, 0, 0, 0, 0, 0, 0, 0}.

Input values of some of QLGs (e.g. Pauli Y QLG, Hadamard QLG) can be complex-numbered and can correspond to respective superpositions of photons with vertical and horizontal polarizations. A required superposition can be provided by source unit 203 prior to injecting photons into the cores of linear combination unit 201, wherein the respective core(s) can be dedicated to complex-number binary input values. Alternatively, linear combination unit 201 can comprise a pre-processing unit (not shown) providing the required superposition after injecting photons in fundamental states into the cores and prior to using the superposed photons as binary input(s) to respectively dedicated core(s).

As will be further detailed with reference to FIGS. 3-4, linear combination unit 201 further mixes the binary inputs with fixed weights enabled by apriori design of the distances between the cores, their size and the refraction indexes of the various mediums of the fiber. Mixing is designed in accordance with a unitary matrix representing a respective OQLG, and fundamental quantum states of photons outputted from linear combination unit 201 correspond to binary output values specified by the matrix.

Figure 3A:
FIGS. 3a-3b illustrate a non-limiting example of optical structure usable for a linear combination unit in a OQLG configured in accordance with certain embodiments of the presently disclosed subject matter.
Figure 3B:
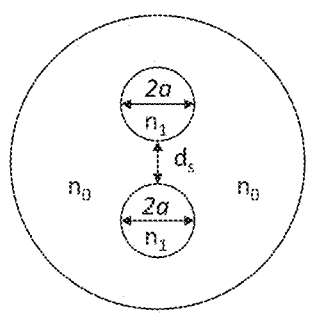

FIGS. 3a-3b illustrate a non-limiting example of an optical structure usable for a OQLG configured in accordance with certain embodiments of the presently disclosed subject matter.

FIG. 3a details a two-core optical structure usable for a linear combination unit in a one-qubit OQLG. It is noted that the teachings of the presently disclosed subject matter are, likewise, applicable to OQLGs operating with other numbers of qubits and respective numbers of cores in a multi-core optical structure.

For purpose of illustration only, the following description is provided for linear combination unit 202 implemented on a separate fiber and integrated with amplification unit 203 in an all-optical structure. Those skilled in the art will readily appreciate that the teachings of the presently disclosed subject matter are, likewise, applicable to linear combination unit 202 and amplification unit 203 implemented on the same fiber and, optionally, on the same cores.

The illustrated example of two-core optical fiber 300 comprises a fiber body 301 extending between a first fiber end 302 and a second fiber end 303. Fiber body 301 houses a first cylindrical core 211 and a second cylindrical core 212 with a fiber cladding 330 therebetween. By way of non-limiting example, cores 211 and 212 can be made of glass, silicon, silica or other material as known in the art of optical fiber fabrication. Material of cladding 230 shall have a refractive index lower than the refractive index of the cores 211 and 212. The cores are configured to enable directional light propagation along the multi-core optical fiber.

First fiber end 302 is configured to receive photons transmitted thereto (through a not-shown input port at first fiber end 302) from source unit 203 and second fiber end 303 is configured to emit photons therefrom (through a not-shown output port at second fiber end 303) to amplification unit 202. Input port is configured to enable transmission of photons into respectively dedicated cores and output port is configured to enable outputting photons from the cores. Optionally, each core can be arranged to have a separate input and/or output port.

As known, each core in a multi-core optical fiber can be used as an independent channel for data transfer. Such transmission channel is configured to enable propagation of light passing therethrough along the channel, substantially without modification of the light intensity.

In accordance with certain embodiments of the presently disclosed subject matter, the cores in linear combination unit 201 are designed (e.g. the distances between the cores, their size, the refraction indexes, etc.) in a manner enabling a desired degree of optical coupling between the cores.

Optical coupling between cores in a multi-core optical fiber is typically realized through evanescent wave coupling. The term "evanescent wave coupling" is referred to a phenomenon when light transfers from a first medium to a second medium as an exponentially decaying wave through a third medium, separating the first medium from the second medium and having a lower refractive index than that of the first medium and the second medium. Evanescent wave leakage between two light propagating mediums, e.g. two cores in an optical fiber, refers to transfer of light from one medium to the other due to evanescent wave coupling.

Evanescent wave coupling between cores is strongly dependent on the cores' diameter and distance between the cores as well as on the mode of light propagation in the core. The optical coupling is considered significant when a signal that is transferred from a first core to a second core due to the optical coupling, has, in the second core, an intensity significantly above a noise level. By way of non-limiting example, in fibers fabricated from materials commonly used in the art, substantial evanescent wave coupling between cores having a diameter of about 8 µm for example, may be achieved when the distance between cores centres is smaller than about 20 µm, and preferably when the distance is smaller than about 10 µm.

FIG. 3b schematically illustrates a cross-sectional view of two-core optical fiber 300. By way of non-limiting example, cores 211 and 212 can be identical and have the same radius a and refractive index $n_1$. Refractive index of cladding is $n_0$ and the size of the gap between the cores is $d_g$.

A coupling length L is defined as the shortest fiber length that is necessary for the incident light power to be transferred completely from one core to another core.

The coupling length can be calculated, for example, with the help of coupled-mode or supermode theories as disclosed in the article by Zhao, T. H., Ren, W. H., Yin, T. Y. and Wang, F. (2021) Calculation of the Coupling Coefficient of Twin-Core Fiber Based on the Supermode Theory with Finite Element Method. Optics and Photonics Journal, 11, 402-411.

As disclosed in the article, the coupling length L can be calculated as L=π/k, where k is a coupling coefficient.

Figure 4A:
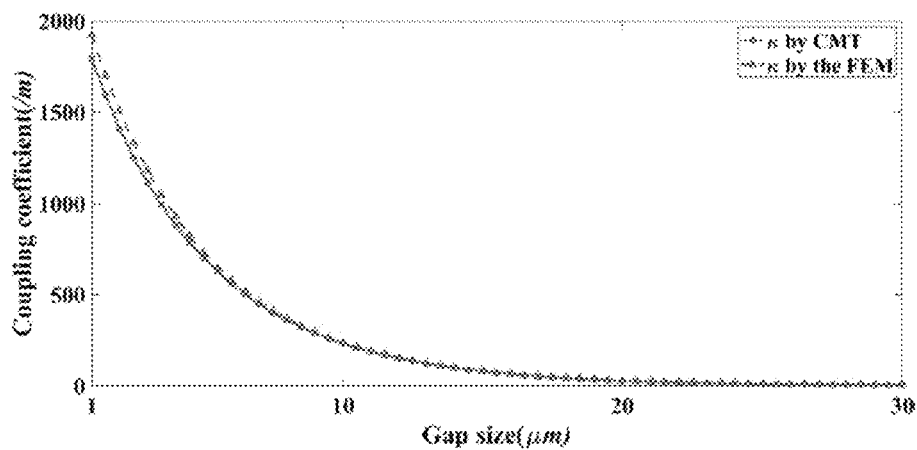
FIGS. 4a-4c illustrate non-limiting examples of dependency of coupling coefficient on the gap size, core radius and relative difference of refractive indexes, as known in the art.
Figure 4B:
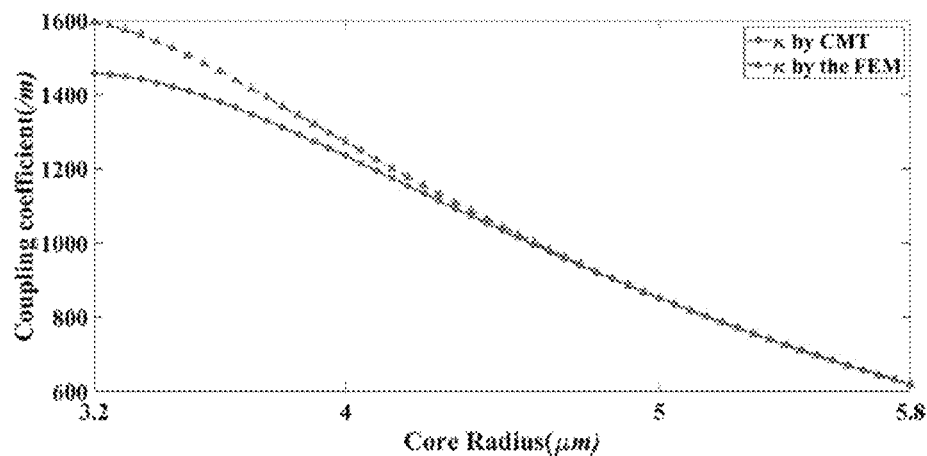
Figure 4C:
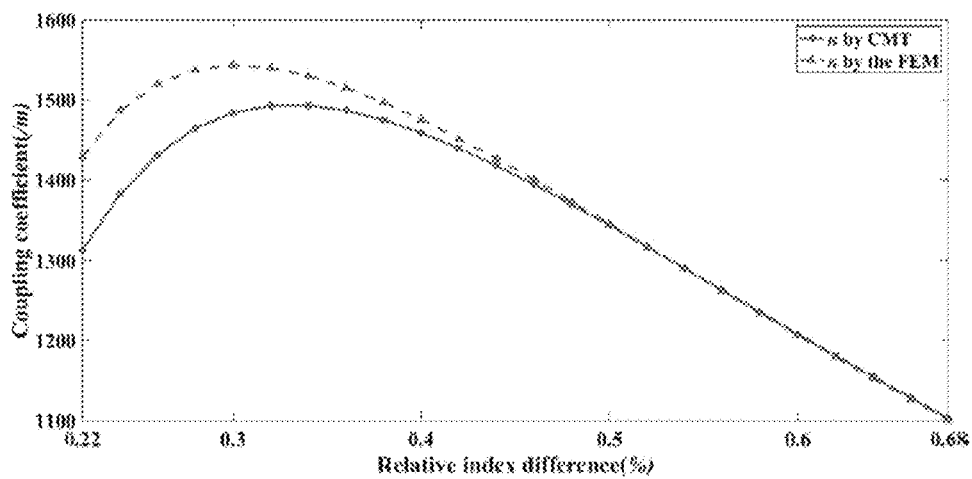

FIGS. 4a-4c illustrate examples of dependency of coupling coefficient on the gap size, core radius and relative difference of refractive indexes as disclosed by Zhao et al. FIG. 4a illustrates coupling coefficient as a function of the gap size for a working wavelength of 1.55 µm, core radius of 3.5 µm, cladding index of 1.444 and relative index difference of 0.25%. FIG. 4b illustrates coupling coefficient as a function of the core radius for gap size of 2 µm, working wavelength of 1.55 µm, cladding index of 1.444 and relative index difference of 0.25%. FIG. 4c illustrates coupling coefficient as a function of the relative index difference for a working wavelength of 1.55 µm, core radius of 3.5 µm, cladding index of 1.444 and gap size of 2 µm.

Thus, the graphs in FIGS. 4a-4c illustrate that a coupling length L can be predesigned for a given working length, by selection of the gap size, core radius and relative difference of refractive indexes. The desired degree of optical coupling between the cores can be defined as a function of the coupling length.

Referring back to FIG. 2, as demonstrated above, selecting geometrical and optical parameters (e.g. cores' radiuses, gap size, refractive indexes of the cores and of the cladding, etc.) of respective optical structure enables mixing the binary inputs (photons) with weights specified by a unitary matrix representing a respective OQLG.

In the Pauli X OQLG illustrated as a non-limiting example in FIG. 2, the geometrical and optical parameters shall be selected so that the length of linear mixing unit 201 corresponds to the coupling length L. In such a case, optical coupling enables that all photons inputted into core 211 are outputted from core 212 (whilst each photon keeps its fundamental quantum states) and vice versa. Thereby, the illustrated linear mixing unit 201 will, as required, flip the values in the single qubit from 0 to 1 or from 1 to 0.

Likewise, for Hadamard OQLG, the geometrical and optical parameters of two-cores linear mixing unit 201 shall be selected so to yield, due to optical coupling:

$$H|0\rangle = \frac{|0\rangle + |1\rangle}{\sqrt{2}} \quad H|1\rangle = \frac{|0\rangle - |1\rangle}{\sqrt{2}}$$

By way of another example, for SWAP OQLG, the geometrical and optical parameters of four-cores linear mixing unit 201 shall be selected so to yield, due to optical coupling, into two swapped qubits:

$$\text{SWAP}|00\rangle = |00\rangle \quad \text{SWAP}|01\rangle = |10\rangle$$
$$\text{SWAP}|10\rangle = |01\rangle \quad \text{SWAP}|11\rangle = |11\rangle$$

Upon outputting from linear mixing unit 201 photons are propagated to amplification unit 202.

Amplification unit 202 is configured to enable controllable non-linear operations and, thereby, controlled amplification of the intensity of optical signal.

Amplification unit 202 can be configured as a separate amplification optical structure optically connected to linear mixing unit 201. The separate amplification optical structure can be configured to comprise controllable amplifying channels corresponding to the channels (cores) in linear mixing unit 201. Amplifying channels in the separate amplification optical structure can operate in a manner similar to amplifying channels in an integrated amplification unit described below.

Alternatively, amplification unit 202 can be integrated with linear mixing unit 201 and configured on the same cores. As illustrated in FIG. 2, each core (211, 212) in the multi-core optical fiber can be configured to comprise at least one mixing segment (segments denoted respectively as 213-1 and 213-2) being a part of linear mixing unit 201 and at least one amplifying segment (segments denoted respectively as 214-1 and 214-2) following the respective mixing segment and being a part of amplification unit 202. Mixing segments 213-1 and 213-2 are optically coupled therebetween to enable weighted mixing of photons in accordance with unitary matrix representing a respective OQLG. Amplifying segments 214-1 and 214-2 constitute amplifying channels, optical coupling between the amplifying segments to be minimized to minimize crosstalk between the cores.

Optionally, OQLG with integrated amplification unit can be implemented utilizing multi-core fiber having tapered configuration. Such configuration allows implementing linear mixing unit 201 in the tapered region enabling optical coupling between the respective segments of the cores and implementing amplification unit 202 in the wide part, thus providing sufficient distance to prevent an optical interaction between the amplifying segments of the cores.

Amplifying segments 214-1 and 214-2 can be impregnated with gain medium (e.g. dopped with erbium ions) configured to provide gain at wavelength range of photons received from the linear mixing unit (referred to hereinafter, respectively, also as "information wavelength" and "information photons") and passing therethrough. Gaining can be achieved in response to pumping optical signal of pumping wavelength range different from the information wavelength range.

Each amplifying channel is associated with a control port (not shown) controlling the amplification in respective amplifying channel. The control port is configured to enable, in response to a control signal specifying a desired amplification factor, amplification required in the channel. Optionally, the control port can be located at first fiber end 302. Optionally amplifying channels of amplification unit 202 can share a common control port configured to enable separate control of amplification in each channel.

The control port enables propagating the pumping optical signal through an amplifying channel, the pumping signal being propagated concurrently with propagating the information photons. The pumping optical signal does not contribute directly to the output of amplification unit (e.g. can be filtered out before or during respective measurements). The gain medium (e.g. erbium dopant ions) of the amplifying channel absorbs the pumping optical signal to generate excitation of respective electrons, while the subsequent relaxation is facilitated by the information photons. During the relaxation process, the dopant ions emit additional photons with wavelength and polarization being the same as of information photons used for relaxation. The amplification factor can be controlled, at least, by defining parameters of the pumping optical signal, gain medium and/or effective length of the amplifying channel.

Thereby, the amplification process in amplification unit 202 can be configured to controllably increase the number of information photons outputting therefrom, whilst keeping polarization and relative quantities of the information photons and, accordingly, the binary values (real or complex numbers) received from linear mixing unit 201.

For example, in the Pauli X OQLG illustrated as a non-limiting example in FIG. 2, information photons (corresponding to binary value "1") will be gained in amplifying channel based on segment 214-2, while there is no need in amplification in amplifying channel based on segment 214-1 (corresponding to binary value "0").

The output of amplification unit 202 can be readout by any suitable interferometer capable to provide quantum readout, i.e. extract fundamental states of the output photons. The readout results are further decoded into respective output binary values (real numbers and/or complex numbers as defined by respective unitary matrixes).

It is noted that the teachings of the presently disclosed subject matter are not bound by the optical systems described with reference to FIG. 2. Equivalent and/or modified functionality can be consolidated or divided in another manner and can be implemented with the help of single-mode or multimode fiber, photonic crystal fiber or alike. Likewise, the disclosed optical system can be implemented as 3D photonic device (e.g. 3D photonic crystal, 3D patterned silica or 3D printed transparent block of polymer, etc.) implementing the disclosed teachings.

Figure 2B:
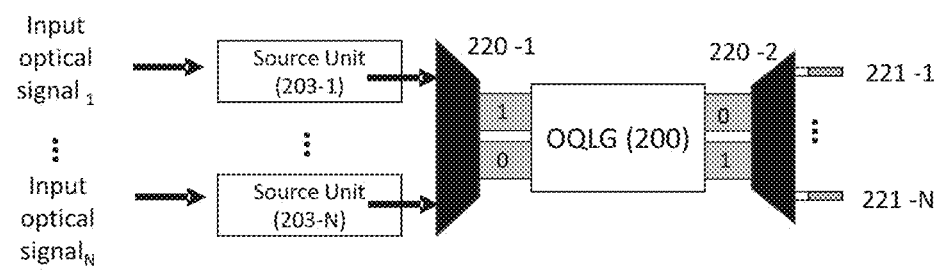
FIG. 2b illustrates a generalized functional block diagram of optical quantum logical gate (OQLG) in combination with wavelength multiplexers in accordance with certain embodiments of the presently disclosed subject matter.

It is noted that OLQGs and arrangements thereof can operate on photons with substantially the same wavelength or on photons with different, relatively close, wavelengths. FIG. 2b illustrates a generalized functional block diagram of optical quantum logical gate (OQLG) in combination with wavelength multiplexers.

N source units (denoted as 203-1-203-n) receive, respectively, N input optical signals, each with it's own wavelength. The wavelengths of N input signals are relatively close so to enable substantially the same optical coupling behavior under the common geometrical and optical parameters of linear combination unit 201, whilst being identifiable during multiplexing. By way of non-limiting example, the relative difference between the wavelengths can be $0.1\% < (\Delta\lambda/\lambda) < 1\%$.

Each source unit generates a plurality of photons in binary fundamental quantum states and with respective wavelength. The generated photons are multiplexed by a WDM terminal 220-1 configured to enable injecting the multiplexed photons into designated optically-coupled cores with one-to-one correspondence to the input binary values as detailed with reference to FIG. 2a.

OQLG 200 processes the injected photons in a manner detailed with reference to FIG. 2a. Outputs of OQLG 200 are further de-multiplexed by WDM terminal 220-2 and transferred to respective optical/electrical transponders (denoted 221-1-221-N), each converting a de-multiplexed signal with a wavelength corresponding to the input signal.

Figure 5:
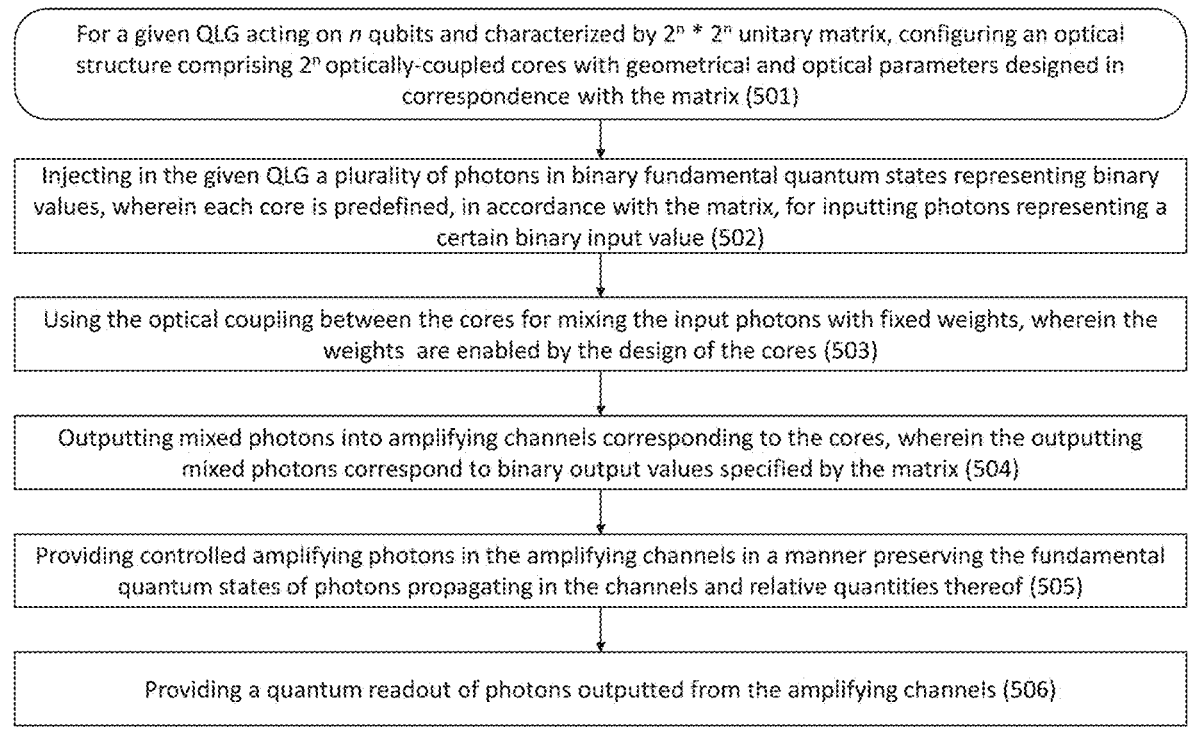
FIG. 5 illustrates a generalized flow-chart of operating a OQLG in accordance with certain embodiments of the presently disclosed subject matter.

Referring to FIG. 5, there is illustrated a generalized flow-chart of operating a OQLG in accordance with certain embodiments of the presently disclosed subject matter.

Prior to operating a given OQLG acting on n qubits and characterized by $2^n*2^n$ unitary matrix, there is configured (501) an optical structure comprising $2^n$ optically-coupled cores with geometrical and optical parameters designed in correspondence with the matrix and with pre-defined one-to-one correspondence to the input binary values specified by the matrix.

When in operation, a plurality of photons in binary fundamental quantum states corresponding to the binary values is injected (502) in the given OQLG, wherein each core among $2^n$ pre-designed optically-coupled cores is pre-defined, in accordance with the matrix, for inputting photons representing a certain binary input value. The input photons are further mixed (503) with fixed weights due to the pre-designed optical coupling, wherein the weights are enabled by the design of the cores.

The mixed photons are outputting (504) into amplifying channels corresponding to the cores, wherein the outputted mixed photons correspond to binary output values specified by the matrix.

There is further provided controlled amplifying (505) photons in the amplifying channels. The amplifying is provided in a manner preserving the fundamental quantum states of the photons propagating in the channels and relative quantities of photons with different fundamental quantum states. Amplifying is followed by quantum readout (506) of photons outputted from the amplifying channels.

In accordance with certain embodiments of the presently disclosed subject matter, OQLGs can be arranged into complex all-optical arrangements as, for example Field-Programmable Gate Arrays (FPGAs), artificial neural networks (ANN), etc. By way of non-limiting example, the principles of combining optical gates into all-optical arrangement, training and operating the respective arrangements are disclosed in International Patent Application WO 2017/033197, International Patent Application WO 2019/186548 and International Patent Application WO2021/064727.

Figure 6:
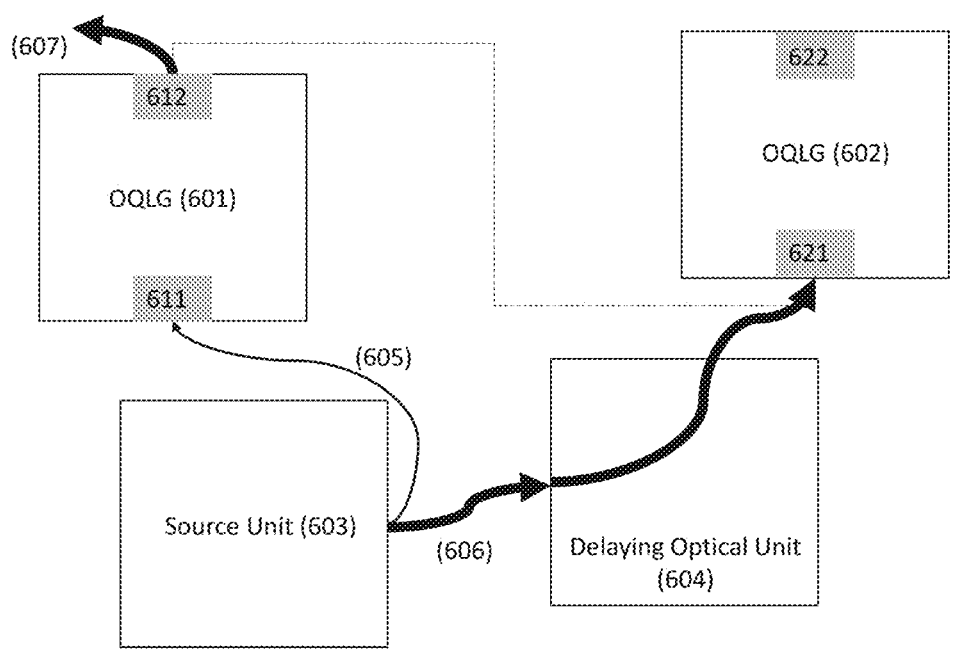
FIG. 6 illustrates a generalized diagram of a fragment of an optical arrangement with OQLGs connected in accordance with certain embodiments of the presently disclosed subject matter.

In accordance with certain embodiments of the presently disclosed subject matter, using the entanglement phenomena can further improve connectivity and/or cascading of OQLGs in all-optical arrangements. Referring to FIG. 6, there is illustrated a generalized diagram of a fragment of an all-optical arrangement comprising a plurality of OQLGs being of the same or of different types and configured to operate as detailed with reference to FIGS. 2-5. The illustrated fragment comprises an OQLG 601 with input 611 and output 612 and OQLG 602 with input 621 and output 622, while output 612 is logically connected to input 621 (the logical connection is illustrated by the dotted line). In certain embodiments, the logical connection from output 612 to input 621 can be provided with no need of a physical connection therebetween.

OQLG 601 and OQLG 602 can be connected to a shared source unit 603 configured to generate a plurality of photons with entangled binary fundamental quantum states and to enable injecting the generated entangled photons into input 611 of OQLG 601 and input 621 of OQLG 602 in a certain proportion.

The photons injected in OQLG 601 are further mixed and amplified as detailed with reference to FIGS. 2-5. Injecting photons with respectively entangled binary fundamental quantum states into input 621 can be delayed relatively to injecting photons into input 611. Optionally, the delay can be provided with the help of an optical delaying structure 604 placed between source unit 603 and input 621 and configured to enable a required delay (e.g. by selecting a length and optical properties of an optical fiber therein). It is noted that, optionally, optical delaying structure 604 can be integrated with OGLG 602.

By way of non-limiting example, the delay can correspond to duration T of propagating photons from input 611 to output 612 in OQLG 601. The distribution of the entangled photons between inputs 611 and 621 can be as 1:G, wherein G is a respective amplification by OQLG 601. Accordingly, source unit 603 can enable injecting in OQLG 601 N photons 605 in a certain binary fundamental quantum state and injecting in OQLG 602 N*G photons 606 in entangled binary fundamental quantum state. Thus, the number and fundamental quantum states of photons 606 are the same as the number and fundamental quantum states of photons 607 outputted from output 612, while photons 606 are injected in input 621 at the same time as photons 607 could be inputted in input 621 if there were a respective physical connection.

Thereby, the detailed above injection of entangled photons into inputs of logically connected gates can replace a respective physical connection. It is noted that the teachings of the presently disclosed subject matter are not bound by the details described with reference to FIG. 6. The proportion of distributing entangled photons between inputs of different gates can be predefined (e.g. in FPGA arrangements) or can be trained to achieve a desired result (e.g. in ANN arrangements).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An optical quantum logic gate (OQLG) acting on n qubits and characterized by $2^n*2^n$ unitary matrix, the OQLG comprising:
    a first optical structure comprising $2^n$ optically-coupled cores with one-to-one correspondence to input binary values specified by the unitary matrix and a second optical structure optically connected to the first optical structure and comprising $2^n$ amplifying channels corresponding to the $2^n$ cores,
    wherein the first optical structure is configured:
        to receive photons in binary fundamental quantum states representing input binary values specified by the unitary matrix and to inject the received photons in the $2^n$ cores in accordance with the one-to-one correspondence of the cores and fundamental quantum states of the photons;
        to use optical coupling between the cores to mix the injected photons, wherein photons are mixed with weights specified by the unitary matrix;
        when a complex-number binary value specified by the unitary matrix is represented by a respective superposition of photons in fundamental quantum states, to mix the received photons prior to injecting the superposed photons in a core corresponding to the complex-number binary value; and
        to output photons into the second optical structure, wherein outputted mixed photons correspond to output binary values specified by the matrix; and
    wherein the second optical structure is configured to amplify photons in the amplifying channels, wherein the amplifying is provided in a controllable manner with preserving, for photons propagating in the amplifying channels, the fundamental quantum states thereof and relative quantities of photons with different fundamental quantum states.

2. The OQLG of claim 1, wherein real-number input binary values specified by the unitary matrix are represented by fundamental quantum states of vertical and horizontal polarization.

3. The OQLG of claim 1, wherein the weights are pre-defined as a function of a coupling length of the first optical structure, and wherein the coupling length is pre-defined by selection of optical and geometrical parameters of the cores and a cladding therebetween.

4. The OQLG of claim 1, wherein the first optical structure and the second optical structure are integrated and implemented on the same cores of a multi-core optical fiber.

5. The OQLG of claim 4, wherein each core of $2^n$ cores in the multi-core optical fiber is configured to comprise a first segment being a part of the first optical structure and a second segment following the first segment and being a part of the second optical structure.

6. The OQLG of claim 5, wherein the multi-core optical fiber is configured to have a tapered configuration with first segments of each core being located in a tapered part enabling optical coupling between the first segments, and with second segments being located in a wide part enabling a distance sufficient to prevent an optical interaction between the second segments.

7. The OQLG of claim 1, wherein each amplifying channel is associated with a control port configured to enable, in response to a control signal specifying a desired amplification factor, amplification required in the amplifying channel.

8. The OQLG of claim 7, wherein each amplifying channel is impregnated with gain medium configured to provide gain at a first wavelength range corresponding to the outputted mixed photons and wherein the gain is achievable in response to a pumping optical signal received via the control port and having a pumping wavelength range different from the first wavelength range.

9. The OQLG of claim 8, wherein the amplification factor is controlled, at least, by defining parameters of the pumping optical signal, gain medium and/or effective length of the amplifying channel.

10. The OQLG of claim 1 configured to be arrangeable into all-optical arrangements of a plurality of OQLGs.

11. An optical quantum logic gate (OQLG) acting on n qubits and characterized by 2n*2n unitary matrix, the OQLG comprising:
    a first optical structure comprising 2n optically-coupled cores with one-to-one correspondence to input binary values specified by the unitary matrix and a second optical structure optically connected to the first optical structure and comprising 2n amplifying channels corresponding to the 2n cores, wherein the first optical structure is configured:
to receive photons in binary fundamental quantum states representing input binary values specified by the unitary matrix and to inject the received photons in the 2n cores in accordance with the one-to-one correspondence of the cores and fundamental quantum states of the photons;
to use optical coupling between the cores to mix the injected photons, wherein photons are mixed with weights specified by the unitary matrix; and
to output photons into the second optical structure, wherein outputted mixed photons correspond to output binary values specified by the matrix; and
wherein the second optical structure is configured to amplify photons in the amplifying channels, wherein the amplifying is provided in a controllable manner with preserving, for photons propagating in the amplifying channels, the fundamental quantum states thereof and relative quantities of photons with different fundamental quantum states; and
wherein the OQLG is operatively connected to at least one second OQLG, wherein a logical connection between an output of the OQLG and an input of the at least one second OQLG is provided with the help of an optical structure configured to generate a plurality of photons with entangled binary fundamental quantum states and to enable injecting, in a certain proportion, the generated entangled photons into an input of the OQLG and the input of the at least one second OQLG.

12. A method of operating an optical quantum logic gate (OQLG) acting on n qubits and characterized by $2^n*2^n$ unitary matrix, the method comprising:
receiving in the OQLG a plurality of photons in binary fundamental quantum states representing input binary values specified by the unitary matrix, wherein the OQLG comprises an optical structure with $2^n$ optically-coupled cores with one-to-one correspondence to the input binary values specified by the unitary matrix, and wherein the received photons are injected in the cores in accordance with the one-to-one correspondence;
using optical coupling between the cores to mix the injected photons, wherein photons are mixed with pre-defined weights corresponding to design of the optical structure;
when a complex-number binary value specified by the unitary matrix is represented by a respective superposition of photons in fundamental quantum states, mixing the received photons to provide the superposition prior to injecting the superposed photons in a core corresponding to the complex-number binary value;
outputting photons into $2^n$ optical amplifying channels corresponding to the $2^n$ cores, wherein outputted mixed photons correspond to output binary values specified by the matrix;
amplifying photons in the amplifying channels, wherein the amplifying is provided in a controllable manner with preserving, for photons propagating in the amplifying channels, the fundamental quantum states thereof and relative quantities of photons with different fundamental quantum states; and
providing quantum readout of photons outputted from the amplifying channels.

13. The method of claim 12, wherein the weights are pre-defined as a function of a coupling length of the optical structure, and wherein the coupling length is pre-defined by selection of optical and geometrical parameters of the cores and a cladding therebetween.

14. The method of claim 12, wherein real-number input binary values specified by the unitary matrix are represented by fundamental quantum states of vertical and horizontal polarization.

15. The method of claim 12, further comprising receiving by a control port of the OQLG a control signal specifying a desired amplification factor in an amplifying channel and providing an amplification in response.

16. The method of claim 15, wherein each amplifying channel is impregnated with gain medium configured to provide gain at a first wavelength range corresponding to the outputted mixed photons and wherein the control signal is a pumping optical signal received via the control port and having a pumping wavelength range different from the first wavelength range.

17. The method of claim 16, wherein the amplification factor is controlled, at least, by defining parameters of the pumping optical signal, gain medium and/or effective length of the amplifying channel.

18. The method of claim 12, wherein the plurality of photons comprises photons with different, relatively close, wavelengths multiplexed prior to receiving by the OQLG.

* * * * *